June 17, 1969      R. W. SAMSEL      3,449,961
OPTICAL READOUT SYSTEMS

Filed Dec. 28, 1964      Sheet 1 of 2

INVENTOR.
Richard W. Samsel
BY His Attorney

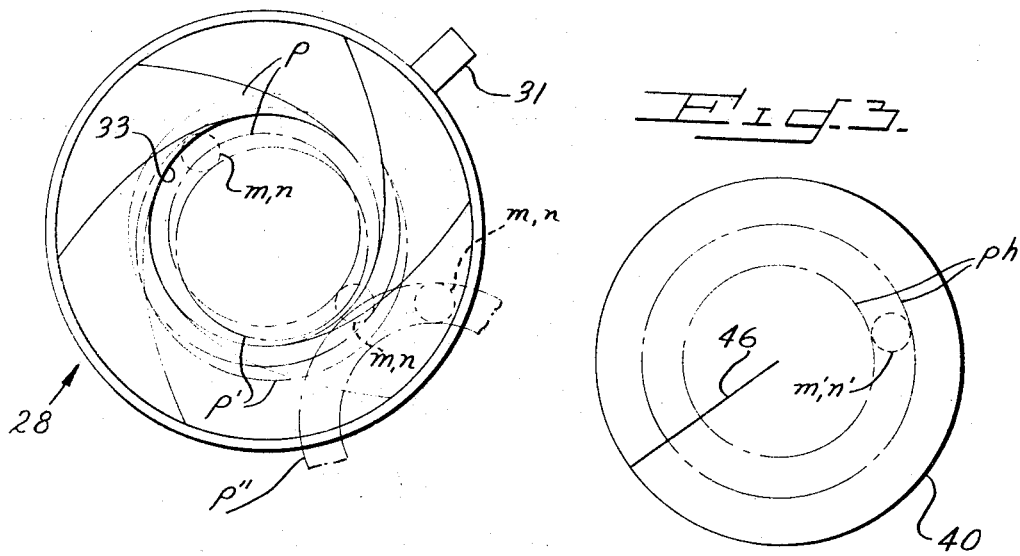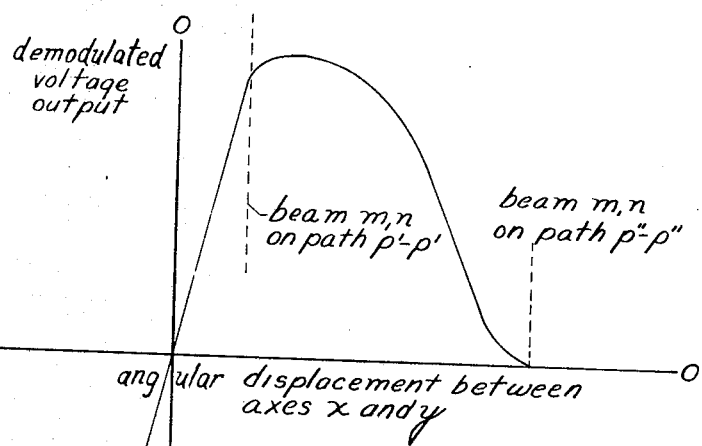

United States Patent Office 3,449,961
Patented June 17, 1969

3,449,961
OPTICAL READOUT SYSTEMS
Richard W. Samsel, Pittsfield, Mass., assignor to General
Electric Company, a corporation of New York
Filed Dec. 28, 1964, Ser. No. 421,275
Int. Cl. G01c *19/28;* G01b *11/26*
U.S. Cl. 74—5.6          6 Claims The present invention relates to improvements in optical readout systems for sensing angular variations in the axis of a rotating member.

To illustrate one highly useful environment for the present invention, reference is made to U.S. Patent No. 3,044,309. In that patent a cryogenic gyroscope is described wherein a gyroscopic element is suspended by magnetic forces and rotated about a spatially constant axis which is normally aligned with a reference axis of the housing therefor. It is necessary to measure or sense deviations between this axis of rotation and reference axis when using the gyroscope for guidance or other purposes. In this particular gyroscope, it is further desirable in making such measurements, that no physical contact be made with the rotating gyroscopic element. In the patent referred to, an auto collimator is employed to direct a collimated beam of light against a mirrored surface disposed on the axial end face of the rotating gyroscopic element. The mirrored surface is disposed advantageously in a plane absolutely normal to the axis of rotation so so that the reflected beam remains on the axis of rotation and on the reference axis so long as the two axes were aligned. Upon relative angular displacement between the reference axis and rotational axis, the reflected beam is displaced correspondingly and this displacement of the reflected beam is sensed to measure to detect deviations of the rotational axis.

An optical readout system of this type provides a high degree of accuracy, dependent however, upon the reflecting surface being in a plane which is absolutely normal to the axis of rotation. Any deviation from such absolute relationship introduces a proportionate error in the measuring system. While careful manufacturing techniques can be employed to obtain such absolute normal relationship, or substantially so, it necessarily involves a relative high cost.

Accordingly, one object of the invention is to provide an optical readout system of the type referred to wherein the accuracy of the system is independent, within reasonable limits, of the reflecting surface being absolutely normal to the axis of rotation.

A further object of the invention is to reduce the cost of manufacturing optical readout systems and thereby reduce the cost of gyroscope constructions of the general type employing a rotating gyroscopic element which is suspended for rotation without the use of conventional journal elements.

To these ends an optical readout system is provided for sensing relative angular movement between a rotating member and a reference base. The member has a reflecting flat on its axial end face which is disposed in a plane slightly tilted from a plane normal to the axis of rotation of said member. The readout system comprises means for directing a collimated beam of light parallel to the axis of rotation and against this reflecting flat so that a beam of light reflected from the flat travels in a conical path. Means are provided for vignetting the outer portion of the annular path of the conically traveling reflected beam. Means are then provided for detecting changes in the vignetting action on the reflected beam as a result of relative angular movement between the axis of rotation and the reference base.

It is also preferable that means derived from the conically traveling beam of light be further provided for relating in a phase sense changes of the vignetting of the reflected beam to the angular position of the rotating member to thus reflect the direction of relative angular movement between rotational axis of the member and the reference base.

The above and other related objects and features of the invention will be apparent from the following description of the disclosure found in the accompanying drawings and the novelty thereof pointed out in the appended claims.

In the drawings:

FIGURE 1 is a diagrammatic illustration of the present invention illustrating its use in combination with a gyroscope of the type referred to;

FIGURE 2 is a view, exaggerated as to proportions, taken on line II—II in FIGURE 1 illustrating vignetting means employed;

FIGURE 3 is a view taken on line III—III in FIGURE 1 and also exaggerated as to certain relationships in order to illustrate phase synchronization means which are provided; and FIGURE 4 is a plot of voltage readings obtained herein against deflection of the axis of rotation of the gyroscopic element.

Figure 1:
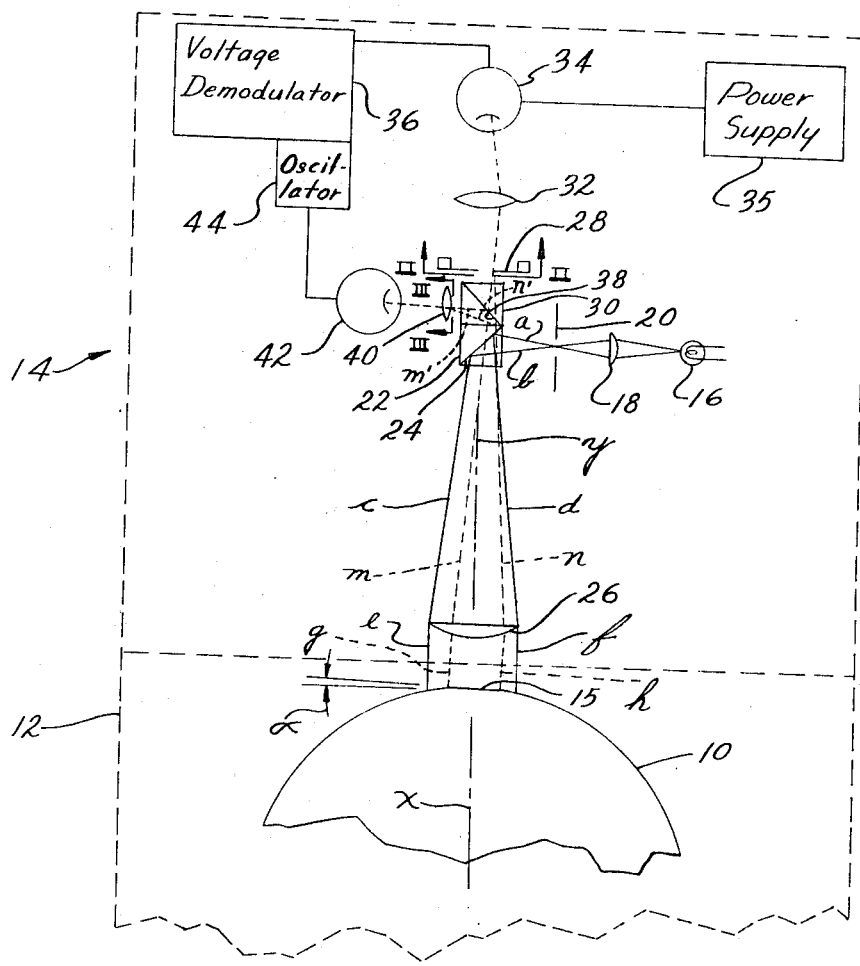

FIGURE 1 diagrammatically illustrates those portions of the gyroscope referred to above which are pertinent to the present invention. Thus, a gyroscopic rotor 10 is spun about a spatially constant axis $x$ within a reference base or housing 12. The present optical readout system 14 is mounted on the housing 12 and serves the same basic function as the optical readout system described in the aforementioned patent of generating a control signal in response to relative angular displacement between the axis $x$ and a reference axis $y$ of the housing 12. The control signal may then be employed through known means to return the axis $x$ to its original relationship with the housing 12. Usually, the housing 12 will be designed as a stable table which is gimbal mounted and the control signal will operate torquers that act upon the gimbals to realign the housing axis $y$ with the rotor axis $x$ to thereby maintaining the housing 12 in a spatially fixed attitude about two axes.

The present optical readout system is based on the same general principle of operation as that referred to above in that a collimated beam of light is directed against a reflecting mirror or flat 15 on the axial end face of the rotor 10. However, this important distinction now exists in that it is assumed that the flat 15 will not be in a plane which is normal to the axis $x$ to an absolute degree as is provided in the optical readout system for a conventional gyroscope.

Thus, it is presumed that the flat 15 will be tilted from a true normal plane by an angle OC in the order of ⅓° which would be a normal deviation in manufacturing the rotor 10 with available machining or fabrication tolerances. In the drawings, the angle OC has been shown as being substantially greater than ⅓° to better illustrate the principles involved.

More specifically, the readout system 14 comprises a light source 16 which directs a field of light that is focused by a condenser lens 18 on a pinhole reticle 20. This point source of light provides a field bounded by lines *a* and *b*, which passes to a beam splitter 22 of the usual 2-prism type. Light field *a*, *b* is reflected by the angled surface 24 of the beam splitter 22 to a field *c*, *d*, which is directed to a collimating lens 26 thereby providing a collimating light field, *e*, *f*, which is incident on the flat 15. Reference is made to the patent above referred to, illustrating specific structure for transmitting such an incident beam to a rotor rotating in an environment of extreme cold.

The reflected beam *g*, *h*, from the flat 15, follows a conical path as the rotor 10 rotates about the axis *x*. The reflected beam *g*, *h*, is focused as beam *m*, *n* by the collimator lens 26 on an adjustable aperture iris 28, after passing through the beam splitter 22 and a second beam splitter 30. The iris 28 is disposed in a plane spaced from the lens 26 the same optical distance as the pinhole aperture 20 so that the beam *m*, *n* is focused thereat. In other applications, the beam may be defocused in conventional fashion when it is desirable to shape the response curve.

The reflected beam *m*, *n* follows a circular or annular path *p—p* as the rotor 10 rotates about axis *x*. These relationships are exaggerated in FIGURE 2 for illustrative purposes. The diameter of the circular path *p—p* is a function of the tilt angle OC. At this point it will be noted that the optical axes of the iris 28, beam splitters 22 and 30, and lens 26 are coincident with the reference axis *y* which in turn is normally aligned with the rotational axis *x*.

The iris 28 may be of conventional design and provided with a knob 31 to adjust the diameter of its aperture 33. In accordance with the present objects the opening of the iris aperture 33 is adjusted to vignette an outer portion of the annular path *p—p* of the beam *m*, *n*. Preferably, the opening of the iris 28 is adjusted so that approximately half of this annular field is vignetted, while the other half passes therethrough. Thus, a rotating beam *q* is directed to a lens 32 which renders it stationary on a fixed area of photosensitive tube 34 as a beam of constant intensity. A power supply 35 provides an electrical potential source for the photosensitive tube 34 and its output is connected to a voltage demodulator 36 providing a fixed signal thereto.

The above describes the null or balanced condition of the optical readout system. If there is relative angular movement between the platform 12 and the rotor 10, the reflected beam of light focused at the iris 28 will be proportionately displaced to an illustrative path *p'—p'* (FIGURE 2). It will be apparent that this beam is now almost completely vignetted during a portion of each cycle of advance along path *p'—p'*. The beam of light focused in the photocell 34 is correspondingly increased and decreased, thus producing pulses of energy which are proportionate to the amount of angular displacement and occur at a time in the cycle of rotor rotation reflecting the direction of tilt between the axes *x* and *y*. These voltage signals are transmitted to the voltage demodulator which converts them into a phase sensitive output reflecting both extent and direction of the displacement between rotational axis *x* and reference axis *y*. The output signals of the voltage demodulator can be transmitted by known means to operate servomotors in the form of torquers which will return the housing 12 to a position in which reference axis *y* is again aligned with the rotor axis *x* if the gyroscope is, for example, to function as a stable table.

Since rotation of the rotor 10 is not necessarily synchronous with any fixed reference, it is preferred to synchronize operation of the voltage demodulator and obtain a phase sensitive output in the following manner, employing the second beam splitter 30 previously referred to. Thus, it will be seen that the reflected beam *m*, *n* (traveling in a conical path), is also reflected as beam *m'*, *n'* from the angular surface 38 of the second beam splitter 30 and focused on a condenser lens 40 (see also FIGURE 3) which is optically spaced from the reflecting flat 15 approximately the same distance as the pinhole reticle 20.

The reflected beam *m'*, *n'* thus follows an annular path *ph* around the condenser lens 40. The lens 40 renders the beam *m'*, *n'* stationary on a second photosensitive tube 42 which may also be energized by the power supply 35. The output of this second photosensitive tube 42 is connected to an oscillator 44 which is a component of the voltage demodulator 36.

It will be noted that a radial line 46 is provided on the lens 40. Thus, as the light beam *m'*, *n'* follows its annular path *ph*, the line 46 interrupts the light passing to or permits the light to pass to the second photosensitive tube 42. This creates a reference signal at the tube 42, once for each rotation of rotor 10 which, through known means is employed to synchronize operation of the oscillator 44 and the voltage demodulator 36 to the rate of rotation of the rotor 10 and its instantaneous angular position. Alternately, the above interruption may be produced by passing the beam through a slit in an otherwise opaque medium. Still other optical means are contemplated for modulating the beam to create the reference signal with each cycle of rotation.

It is recognized that the present system is limited as to the extent of angular deflection which it will detect, however, remarkable accuracy is obtained over the narrow range normally tolerable for deviation between the rotor axis *x* and the reference angle *y*. This is further illustrated by the plot of the output voltage of photosensitive tube 34 as demodulated by demodulator 36 against angular displacement of the rotor axis which is found in FIGURE 4.

At the null position wherein the axes *x* and *y* are aligned and beam *m*, *n* follows path *p—p* (FIGURE 2), the output voltage of the demodulator 36 is considered as a "0" reference point or value. As relative movement between the axes *x* and *y* occurs, this path of the beam *m*, *n* is progressively displaced eccentrically of the iris aperture and an alternating voltage is developed by the photocell proportionate to fluctuation in light intensity passing through the iris aperture 33. The increase in voltage fluctuation is linearly proportionate to angular displacement of the rotational axis *x* approximately as long as a portion of the beam *m*, *n* is vignetted by the iris aperture, path *p'—p'* indicates the approximate limit of this linear relation both in FIGURES 2 and 4. For one particular embodiment, the range of this linear relationship has been found to be in the order of 10 arc minutes which is satisfactory for present purposes. However, it is to be expected that wider ranges can be attained where desired.

If further deviation of the axis *x* occurs, a nonlinear relationship results and if continued long enough the beam *m*, *n* can actually be displaced to a path *p"—p"* (FIGURE 2) in which no light passes through the aperture 33 and again a steady voltage state exists on the photocell 34.

In connection with the range of operation of the present system, it has been found that the size of the so-called point source of light provided by the pinhole rectile 20 is a factor. Satisfactory results were obtained using pinhole diameters between .007 and .020 inch with the larger diameters providing a greater range. It should be understood that said disclosed size range is not critical in the practice of the invention.

While the present invention has been described in connection with a specific gyroscope, its utility is of equal significance when used with other types of gyroscopes having a rotating gyroscopic element free of end journals. In a broader sense, the invention has utility in any sensing system where a beam is to be reflected from a flat on the axial end of a rotating member.

It will also be apparent that the use of an adjustable aperture iris permits a sensing device to be accurately tailored to the devitaion of the reflecting surface from a true normal plane as may be found in any given gyroscope and that once adjusted the system should perform accurately for the life of the gyroscope. It will also be apparent that other means could be employed to vignette the outer portion of the annular path of the conical beam and the scope of the invention is therefore to be derived from the following claims. The adjustable means by which the image is vignetted in the practice of the invention can be adjustable relay lens means disposed in the light path to project the beam to a fixed aperture. In this fashion, the combination of said relay lens means and a fixed aperture cooperate to achieve the same result as provided by the single adjustable iris aperture hereinbefore described.

What I claim as new and desire to be secured by Letters Patent of the United States is:

1. An optical readout system for sensing relative angular movement between a rotating member and a reference base wherein the member has a reflecting flat on its axial end face which is disposed in a plane slightly tilted from a plane normal to the axis of rotation of said member, said system comprising means for directing a collimated beam of light, parallel to said axis of rotation, against said flat whereby a beam of light reflected from said flat travels in a conical path, adjustable means optically concentric with said axis of rotation for vignetting the outer portion of the annular path of said conically traveling reflected beam, photosensitive means for detecting changes in the vignetting of said reflected beam as a result of relative angular movement between the reference base and said axis of rotation, and means for relating in a phase sense changes in the vignetting of said reflected beam to the angular position of the rotating element to thus provide an indication of the direction of such relative angular movement.

2. An optical readout system for sensing relative angular movement between a rotating member and a reference base wherein the member has a reflecting flat on its axial end face which is disposed in a plane slightly tilted from a plane normal to the axis of rotation of said member, said system comprising means for directing a collimated beam of light, parallel to said axis of rotation, against said flat whereby a beam of light is reflected therefrom which travels in a conical path, adjustable means concentric of said axis of rotation and lying in a plane normal thereto for vignetting the outer portion of the annular path of said conically traveling reflected beam, a photosensitive cell receiving the light passing through said adjustable means and means for detecting in a phase sense changes in the output of said photosensitive cell resulting from displacement of the annular path of the reflected beam to a position eccentric of said axis of rotation as a result of relative angular movement between said axis of rotation and said reference base.

3. An optical readout system for sensing relative angular movement between a rotating gyroscopic member and a housing therefor wherein the gyroscopic member has a reflecting flat on its axial end face which is disposed in a plane slightly tilted from a plane normal ot the axis of rotation of said gyroscopic member, and further wherein the housing has a reference axis normally aligned with the axis of rotation of said gyroscopic member, said readout system comprising a collimating lens facing said flat, a beam splitter spaced outwardly thereof and an adjustable aperture iris optically concentric with said axis of rotation outwardly of the beam splitter, the optical axes of said collimating lens, said beam splitter and said iris being coincident with said reference axis a point light source directed transversely toward said beam splitter, said beam splitter being disposed to direct said point light source towards said collimating lens to thereby provide an incident field of collimated light on said flat whereby a beam of light is reflected from said flat traveling in a conical path, said reflected beam of light further being focused by said collimating lens in a plane beyond said beam splitter, said iris being disposed approximately in a plane normal to the axis of rotation with its aperture adjusted to vignette an outer portion of the annular path of the rotating beam of light in said plane, photosensitive means for detecting changes in intensity of the light passed by the aperture when there is relative angular movement of the axis of rotation which causes the annular path of the beam of light at said aperture to be disposed eccentrically thereof, and phase sensitive electrical means associated with said photosensitive means for providing a signal indicating direction and magnitude of the angular displacement between said axis of rotation and said reference axis.

4. An optical readout system as in claim 3 wherein a second beam splitter is disposed in the path of the conically traveling reflected beam of light and deflects a portion thereof from said reference axis to a second photosensitive means and means for modulating this deflected beam once during each cycle of travel along its conical path to generate a signal reflecting the rate of rotation of said gyroscopic member to thereby provide an indication of the direction of angular displacement between the rotational reference axes.

5. An optical readout system for sensing relative angular movement between a rotating gyroscopic member and a housing therefor wherein the gyroscopic member has a reflecting flat on its axial end face which is disposed in a plane slightly tilted from a plane normal to the axis of rotation of said gyroscopic member, and further wherein the housing has a reference axis normally aligned with the axis of rotation of said gyroscopic member, said readout system comprising a collimating lens facing said flat, a beam splitter outwardly thereof and an adjustable aperture iris optically concentric with said axis of rotation disposed outwardly of the beam splitter, the optical axes of said collimating lens, said beam splitter and said iris being coincident with said reference axis, a point light source directed towards said beam splitter, said beam splitter being disposed to direct said point light source toward said collimating lens to thereby provide an incident field of collimated light on said flat whereby a beam of light is reflected from said flat traveling in a conical path, said reflected beam of light further being focused by said collimating lens in a plane beyond said beam splitter, said iris being disposed approximately in said plane of focus with its aperture adjusted to vignette the outer portion of the annular path of the rotating beam of light in said plane, an electrical potential source comprising a photosensitive tube spaced beyond said iris, lens means for rendering the rotating beam of light passed by said iris aperture stationary on said photosensitive tube, a voltage demodulator connected to the output of said photosensitive tube and means rendering said voltage demodulator phase sensitive to the rotation of said gyroscopic member whereby relative angular movement between the axis of said gyroscopic member and the reference axis of said housing will result in displacement of the annular path of light at said iris to a path eccentric of the opening thereof, thus causing fluctuations in the output of said photosensitive tube and resultant phase sensitive signals from said voltage demodulator, indicating the direction and magnitude of the angular displacement between the axis of rotation and the reference axis.

6. An optical readout system as in claim 5 wherein a second beam splitter is disposed in the path of the conically traveling reflected beam of light and deflects a portion thereof from the reference axis, and further comprises a second photosensitive tube, second lens means for focusing the deflected beam of light on said second photosensitive tube, said voltage demodulator comprising an oscillator for controlling its phase orientation, means interposed in the annular path of the deflected beam for modulating this beam once during each cycle of travel to generate from the second photosensitive tube a signal reflecting the rate of rotation of the gyroscopic member, the signal from said second photosensitive tube being connected to said oscillator to thereby synchronize its operation to the rotation of the gyroscopic member and thereby make the signals of the voltage demodulator phase sensitive to rotation of the gyroscopic member.

References Cited

UNITED STATES PATENTS

| | | |
|---|---|---|
| 2,462,925 | 3/1949 | Varian _____ 250—203 X |
| 2,517,612 | 8/1950 | Varian. |
| 2,655,848 | 10/1953 | Gray _____ 250—229 X |
| 2,871,706 | 2/1959 | Fisher et al. _____ 74—5 X |
| 2,965,763 | 12/1960 | Lemmerman _____ 250—203 |
| 2,981,843 | 4/1961 | Hansen _____ 250—203 |
| 3,044,309 | 7/1962 | Buchhold _____ 74—5 |
| 3,165,632 | 1/1965 | Hansen _____ 250—203 |
| 3,200,510 | 8/1965 | Hunter _____ 74—5.6 |
| 3,277,304 | 10/1966 | Vyce. |

JEWELL H. PEDERSEN, *Primary Examiner.*

A. A. KASHINSKI, *Assistant Examiner.*

U.S. Cl. X.R.

250—203; 356—152